(12) United States Patent
Olive

(10) Patent No.: US 6,848,663 B2
(45) Date of Patent: Feb. 1, 2005

(54) SYSTEM OF BENDABLE STRIPS WITH CONNECTORS

(75) Inventor: Gary L. Olive, Conroe, TX (US)

(73) Assignee: ABC Patent Corporation, Conroe, TX (US)

( * ) Notice: Subject to any disclaimer, the term of this patent is extended or adjusted under 35 U.S.C. 154(b) by 0 days.

(21) Appl. No.: 10/368,852

(22) Filed: Feb. 19, 2003

(65) Prior Publication Data

US 2004/0159760 A1 Aug. 19, 2004

(51) Int. Cl.$^7$ ................................................ A47H 1/10
(52) U.S. Cl. ................................................... 248/317
(58) Field of Search ........................... 248/163, 220.21, 248/317, 220.22, 302; 24/17 B, 23 EE, 20 S, 274 WB, 275; 403/291, 220, 221, 300, 301, 302, 307, 306

(56) References Cited

U.S. PATENT DOCUMENTS

| | | | | | |
|---|---|---|---|---|---|
| 1,030,661 | A | * | 6/1912 | Inge | ............................ 24/700 |
| 3,808,847 | A | * | 5/1974 | Vesely | ............................ 70/18 |
| 4,540,006 | A | | 9/1985 | Collis | |
| 4,666,417 | A | | 5/1987 | Hillman | |
| 4,719,773 | A | * | 1/1988 | Alberts | ............................ 70/18 |
| 4,986,457 | A | * | 1/1991 | Faris | ............................ 223/1 |
| 5,003,929 | A | * | 4/1991 | Dean | ............................ 119/784 |
| 5,054,299 | A | | 10/1991 | Maveety | |
| 5,443,038 | A | * | 8/1995 | Marino | ............................ 119/784 |
| 5,498,190 | A | | 3/1996 | Ganson | |
| 5,853,212 | A | | 12/1998 | Daniel | |
| 6,050,613 | A | * | 4/2000 | Wartluft | ............................ 285/328 |
| 6,070,769 | A | * | 6/2000 | Hornsby | ............................ 222/529 |
| 6,113,170 | A | | 9/2000 | Daniel | |
| 6,196,597 | B1 | | 3/2001 | Karnes | |
| 2002/0136594 | A1 | * | 9/2002 | Faris | ............................ 403/291 |

* cited by examiner

Primary Examiner—Leslie A. Braun
Assistant Examiner—Kofi Schulterbrandt
(74) Attorney, Agent, or Firm—Mary J. Gaskin

(57) ABSTRACT

A system for hanging, tying and securing articles, comprising bendable strips with an outer layer of foam rubber material having a plastic-coated flexible wire running lengthwise inside. Protective plastic caps can be placed on each end of the strip. The ends of two or more bendable strips can be joined with one or more connectors. Alternatively, the bendable strips can have complementary threaded ends, and two or more of such strips can be joined together. An adapter can be used to complete a circular configuration. The system can be sold in a package containing bendable strips, connectors, protective caps and cutters.

7 Claims, 6 Drawing Sheets

SYSTEM OF BENDABLE STRIPS WITH CONNECTORS

BACKGROUND OF THE INVENTION

The present invention relates to a system of bendable strips of foam-encased wiring with connectors for providing longer strips. The strips can be used for tying, fastening, bundling, hanging, organizing, and carrying various objects.

Presently, rope is the most common material in use for tying or hanging objects. However, often a piece of rope is too long, with ends which need to be tied off or wrapped during use to prevent tangling. Use of ropes requires knowledge in tying knots, which can later be difficult to untie. Rope itself does not present a "finished" look when used for tying or hanging. Further, ropes have no "rigidity".

Rigid products such as pre-formed hangers or fasteners made from aluminum wire, steel, or plastic, are used to make plant hangers, bike racks, or garage organizers. Each such item, having a particular shape and design, is typically suitable for only one particular use.

Other tying and fastening products on the market for use in tying, fastening, or bundling objects are expandable, made from an elastic material such as bungee cord. Such products are limited in application. They cannot hold their shape during use and can become "exhausted" after many uses.

Finally, the products referred to above cannot be adjusted in length after they are purchased. Rope and bungee cord could be lengthened only by typing together two or more lengths, again requiring knowledge of knots, possibly compromising the overall strength of the product. Hangers cannot be lengthened at all.

SUMMARY OF THE INVENTION

The present invention provides a tying system which is simple to use, for people of all ages and physical agility. The present invention can be used for tying, fastening, carrying, bundling, hanging, and organizing various objects, particularly household, automobile, boating, lawn and garden, sporting and animal accessories. The present invention can be twisted or connected together to form a circle. The design eliminates the need to know how to tie knots. The present invention is lightweight and easy to store. It can be used in both interior and exterior applications, in any kind of weather.

The present invention comprises one or more bendable strips, each having at least one inner wire made of steel or aluminum. Two or more such wires can be used for additional strength and resistance. Each wire can be coated with a flexible plastic material to increase the durability of the product. The coated wire(s) are surrounded by a layer of durable foam rubber material, which feels soft to the user's touch. The outer foam layer helps prevent slippage of the items being tied. The radius of the exterior foam layer can be varied, depending on the application.

Disclosed herein are three different embodiments of the present invention. In the simplest embodiment, pieces of the bendable strips can simply be cut from a rolled length of material. The ends can be crimped to cover the exposed wire, or the ends can be covered with protective caps.

In a second embodiment, a protective cap can be inserted into each end of each premeasured strip. When using either the first or the second embodiments, the user can extend the length, as needed, by joining two or more pieces, end to end, with a finger type pulling weave connector, which is placed over the ends of adjoining strips, with the weave connector tightening as the pieces are pulled apart. Alternatively, the user can form a single bendable strip into a circle, using one of the connectors.

In a third embodiment, each pre-measured, bendable strip will have a male threaded end and a female threaded end, which can be joined, complementary end to end, for additional length. Two or more bendable strips can complete a circle by use of a female to male adapter. A protective cover can be inserted into or over each unattached end to protect the threads and to provide a "finished" appearance.

The present invention can be packaged to include several lengths, or strips, of the product, each 24 inches to 36 inches in length. Alternatively, a length of the product can be wound around a bobbin. Protective caps, cutters, and an adaptor can be included.

The present invention can be used not only for tying or bundling objects, but also to complete a circle. Such an application allows uses such as hanging a plant; tying a tree to a stake; carrying or hanging tools; hanging bicycles and camping equipment; hanging tools in the bed of a truck; hanging animal feed buckets on fences, stalls or trailers; containing an animal in a pen; holding pipes in racks; and holding ladders on ladder racks.

DESCRIPTION OF THE PREFERRED EMBODIMENT

Figure 1:
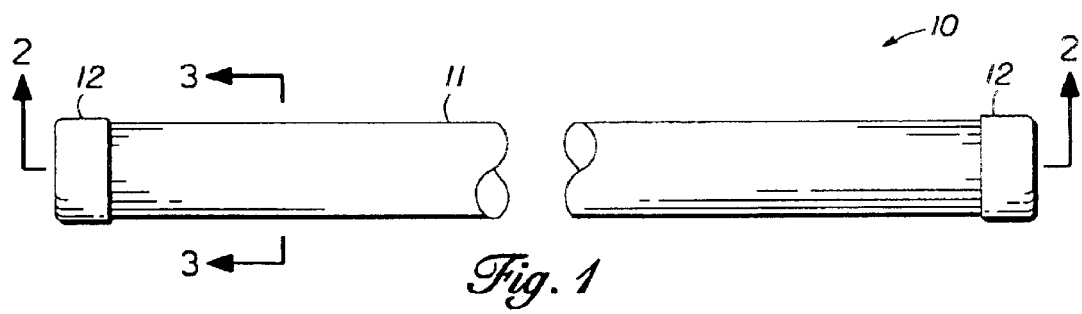
FIG. 1 is a side view of a bendable strip made according to a first embodiment of the present invention, with end caps covering cut ends.

In FIG. 1, the single bendable strip 10 has an exterior foam layer 11 of durable, dense foam rubber material, which feels soft to the user's touch. A plastic protective cap 12 has been placed over each end of the bendable strip 10.

Figure 2:
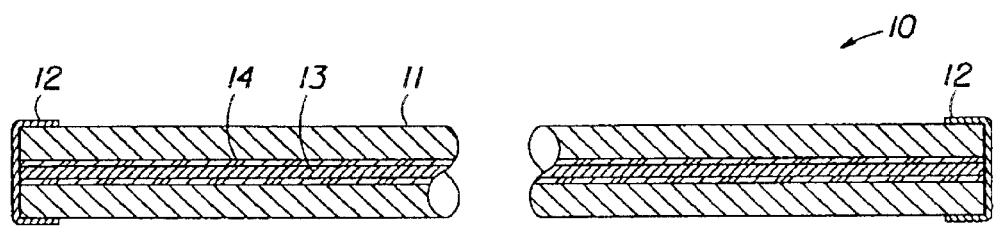
FIG. 2 is a cross-sectional view of one bendable strip, taken along line 2—2 in FIG. 1.

The cross-sectional view of FIG. 2, shows the wire 13 running lengthwise inside the exterior foam layer 11 of the bendable strip 10. The wire is flexible enough to allow the user to bend the strip, but rigid enough so it can be formed into a hook or circle and hold that shape. The wire 13 can be coated with a flexible, plastic layer 14 to increase the durability of the product. Each bendable strip 10 can be sold pre-cut, or a strip can be cut from a rolled length of the strip material. The plastic protective cap 12 placed over each end of the strip 10 protects the user from the cut wire. Alternatively, each end of the strip 10 can be crimped so that the cut end of the wire does not protrude from the foam layer 11.

Figure 3:
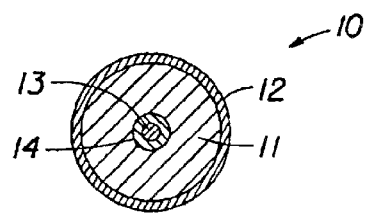
FIG. 3 is a cross-sectional view of the bendable strip, taken along line 3—3 in FIG. 1.

The cross-sectional view of FIG. 3 shows the single wire 13, coated with the plastic layer 14, surrounded by the foam layer 11. Though not shown, two or more coated wires can be arranged parallel to each other at the core of the bendable strip 10 for added strength and resistance. The protective cap 12 on each end is also shown.

Figure 4:
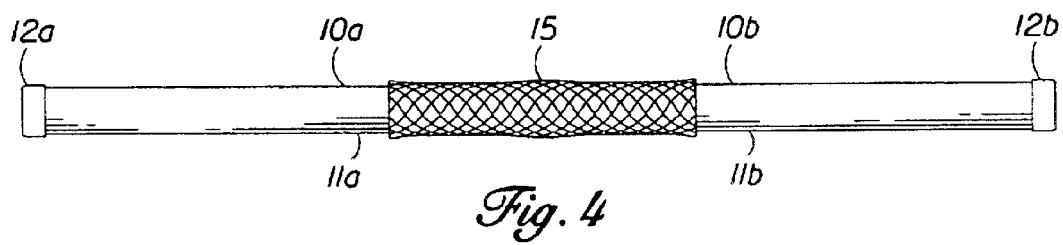
FIG. 4 is a side view of the finger type pulling weave connector joining the ends of two bendable strips of the present invention.

FIG. 4 shows two bendable strips 10a, 10b, joined with a finger type pulling weave connector 15, which can be made from leather, plastic or plastic netting, and, optionally, can be coated with foam. In use, an adjoining end of each bendable strip 10a, 10b is inserted into and end of the connector 15, which engages the exterior of foam layer 11a, 11b of each bendable strip 10a, 10b. Like a Chinese finger puzzle, the connector tightens and prevents the bendable strips 10a, 10b from being pulled apart. Although two bendable strips 10a, 10b are shown joined in a straight line, the connector 15 can be used to join the ends of one or more bendable strips 10 to form a circle. The ends which are not being connected together are covered with protective caps 12a, 12b.

Figure 5:
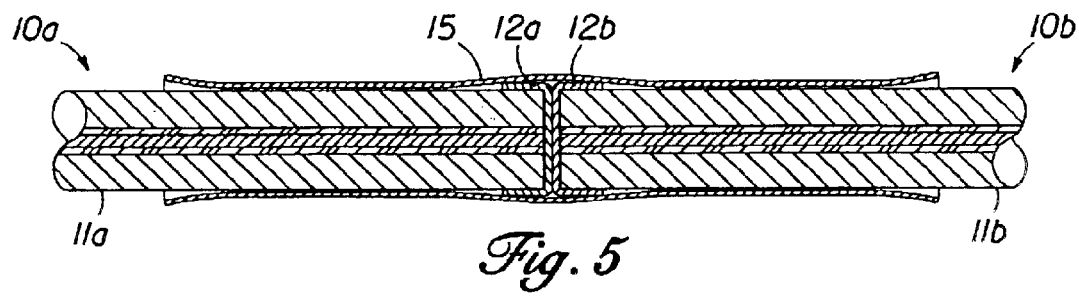
FIG. 5 is a cross-sectional view of the ends of two bendable strips of the present invention, joined by a finger type pulling weave connector.

The cross-sectional view of FIG. 5 shows that the connector 15 can be used over the protective caps 12a, 12b covering the ends of bendable strips 10a, 10b, since it will still engage the exterior of foam layer 11a, 11b.

Figure 6:
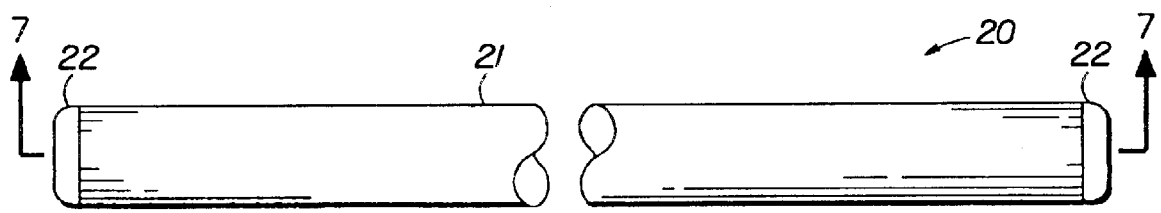
FIG. 6 is a side view of bendable strip made according to a second embodiment of the present invention, with affixed plastic end caps.

In FIG. 6, a second embodiment of the bendable strip 20 is shown, with a plastic end cap 22 at each end, the perimeter of the end caps 22 being flush with the outer surface of the exterior layer 21 of durable, dense foam material.

Figure 7:
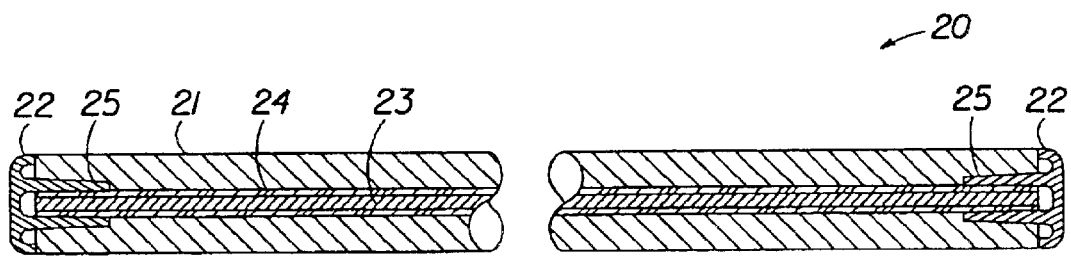
FIG. 7 is a cross-sectional view of bendable strip, taken along line 7—7 in FIG. 6.

The cross-sectional view of FIG. 7 shows the wire 23 running lengthwise inside the foam layer 21 of the bendable strip 20. The wire 23 can be coated with a flexible, plastic layer 24 to increase the durability of the product. Though not shown, two or more coated wires can be arranged parallel to each other at the core of the bendable strip 20 for added strength and resistance. Each end cap 22 has a hollow shaft 25 extending therefrom, which has been installed over the end of the wire 23 and held in place with glue; by heating/melting the inside of the shaft 25; or by machining the inside of the shaft 25 to lock onto the wire 23. The connector 15 shown in FIG. 4 can be used to join two or more bendable strips 20 in a straight line, or one or more bendable strips 20 can be formed into a circle by inserting the ends into a connector 15, as described with reference to the bendable strip 10.

Figure 8:
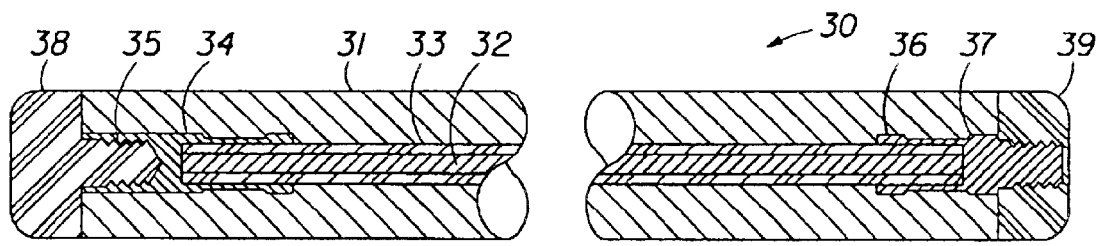
FIG. 8 is a cross-sectional view of a bendable strip made according to a third embodiment of the present invention, having a male threaded end and a female threaded end.

In FIG. 8, the cross-sectional view of a third embodiment of the bendable strip 30 is shown. The exterior foam layer 31 surrounds a wire 32, which can be coated with plastic layer 33, for increased durability. A female threaded ferrule 34 with female threaded end 35 is crimped over the coated wire 32 on one end of the bendable strip 30, and a male threaded ferrule 36 with male threaded end 37 is crimped over the coated wire 32 on the other end of the bendable strip 30. Both ferrules 34, 36 can be made from plastic or metal. A protective male threaded plug 38 can be threaded into the female threaded end 35 of female threaded ferrule 34, and a protective female threaded plug 39 can be threaded over the male threaded end 37 of male threaded ferrule 36.

Figure 9:
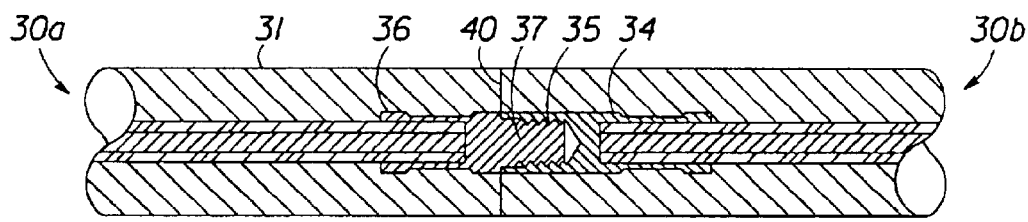
FIG. 9 is a cross-sectional view of the male-female threaded connection joining two bendable strips made according to a third embodiment of the present invention.

FIG. 9 shows the bendable strips 30a, 30b joined at 40. The male threaded end 37 of male threaded ferrule 36 has been threaded into the female threaded end 35 of female threaded ferrule 34, making the exterior foam layer 31 of bendable strips 30a, 30b essentially continuous.

Figure 10:
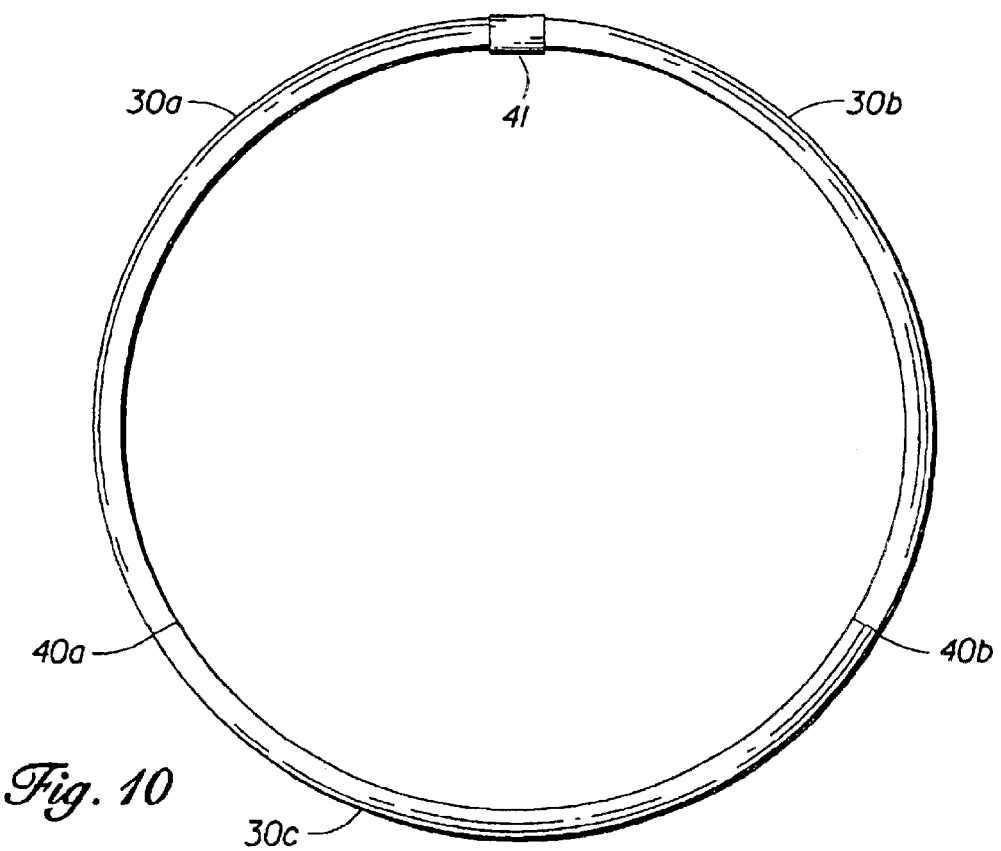
FIG. 10 is a side view of the third embodiment of the present invention showing three bendable strips joined with an adapter to form a circle.

In FIG. 10, three bendable strips 30a, 30b, 30c have been connected together as described in FIG. 9, with joints 40a, 40b, and then formed into a circle by threading the threaded end of bendable strip 30a over female to male adapter 41, and then threading the adapter 41 into the threaded end of bendable strip 30b.

The ability to form the bendable strips 10, 20, 30, into a circle allows them to be used in a variety of ways.

Figure 11:
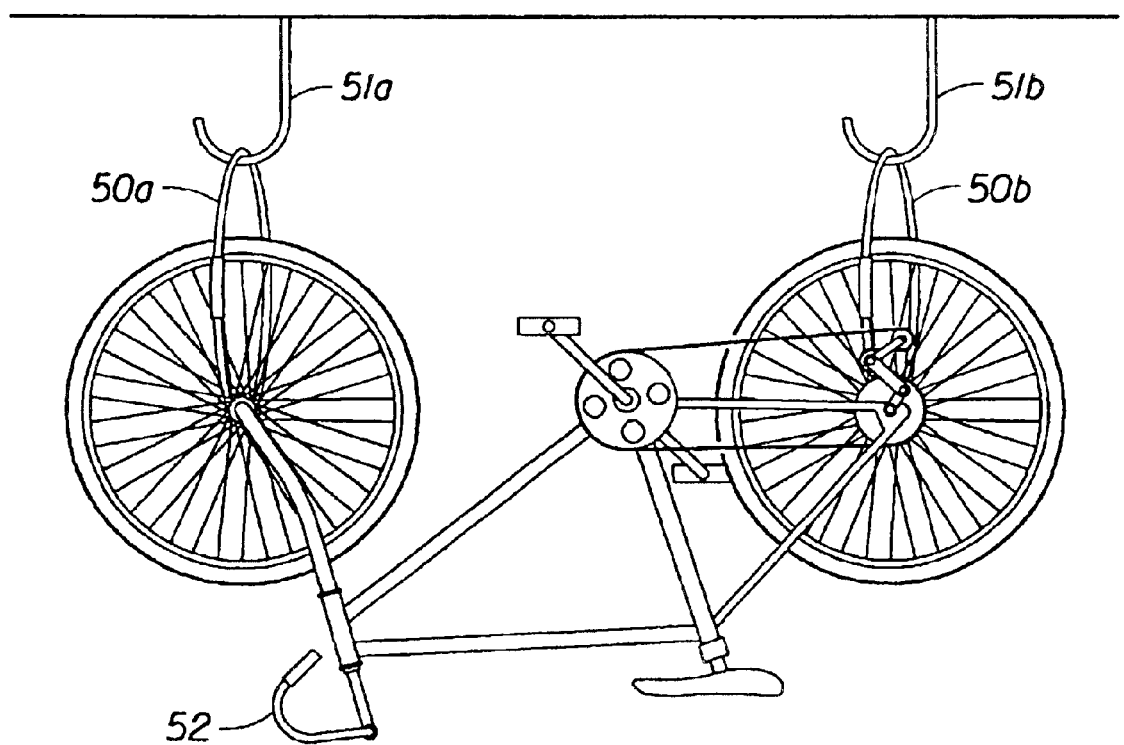
FIG. 11 is a side view showing the use of the bendable strips of the present invention to hang a bicycle on hooks.

In FIG. 11, two of the bendable strips 50a, 50b are hung from hooks 51a, 52a and then formed into circles to hold the wheels of a bicycle 52.

Figure 12:
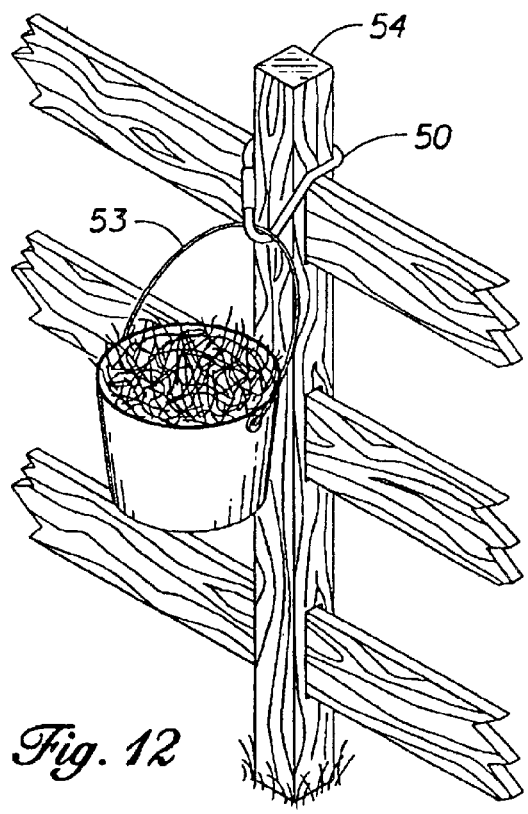
FIG. 12 is a perspective view showing the use of a bendable strip of the present invention to hang a feed bucket on a fence post.

In FIG. 12, a bendable strip 50 is threaded through the handle 53 of a bucket and around the post 54 of a fence and then formed into a circle.

Figure 13:
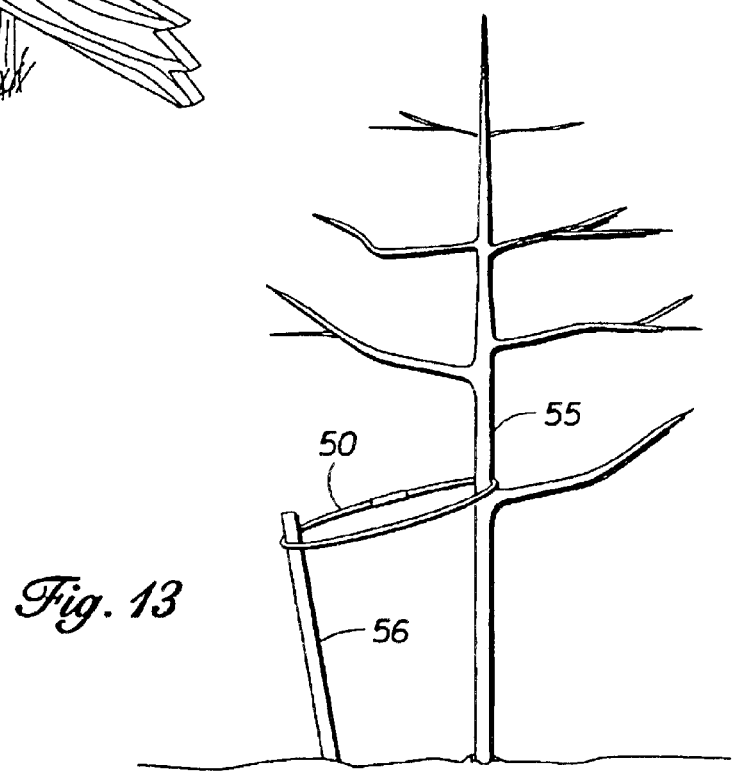
FIG. 13 is a side view showing the use of a bendable strip of the present invention to support a tree with a brace.

In FIG. 13, a bendable strip 50 is wrapped around a tree 55 and a pole 56, then formed into a circle, in order to support the tree 55.

Figure 14:
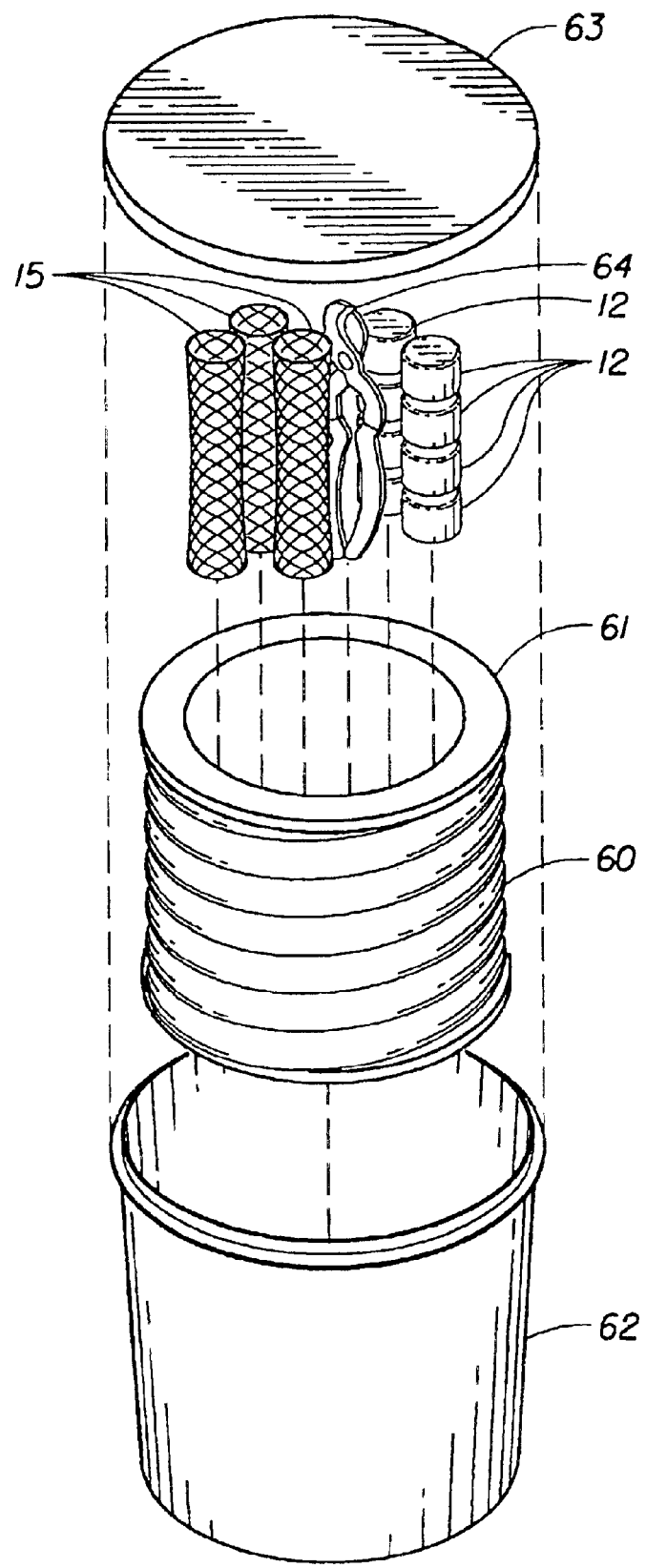
FIG. 14 is a perspective view, exploded upwards, of the contents of a pail for containing parts of the present invention, when it is marketed to consumers.

FIG. 14 shows the type of items which can be packaged together to enable a consumer to use the present invention. A typical kit would contain all of the items necessary to cut, extend, and connect the bendable strips, as well as safety caps. The bendable strips 60, either in a single length or pre-cut, with or without caps or threaded ends, can be wrapped around a bobbin or spool 61, allowing the consumer to unwind or remove the quantity needed for a project. The spool 61 would be lowered into a plastic pail 62. Safety caps 12 (or plugs), connectors 15, and a pair of cutters 64 can be placed in the open core of the spool 61. A plastic lid 63 fits over the top of the pail 62. A user would have no need to purchase or have access to additional tools or items. The kit could be carried outside to the yard, garage, boat, etc., with all the items necessary to complete a project. The lightweight kit would be used by all types of consumers, including farmers, campers, motor home owners, and bikers.

The bendable strips can also be folded or aligned side by side and sold in plastic pouches, along with safety caps and connectors.

Finally, a length of bendable strip material could be placed on a large wooden or plastic spool, and a consumer could purchase the product by the linear foot. Separate packages of connectors and safety caps or plugs would be available as described herein would be available for purchase separately.

I claim:

1. A system for hanging, tying and securing articles comprising:

an elongate first bendable strip having a longitudinal axis, and further having a length of plastic-coated wire disposed along the longitudinal axis, the wire having a ferrule with male threads on one end and a ferrule with female threads on a second end;

an elongate second bendable strip having a longitudinal axis, and further having a length of plastic-coated wire disposed along the longitudinal axis, the wire having a ferrule with male threads on one end and a ferrule with female threads on a second end;

wherein the male threads of the first bendable strip are threaded into the female threads of the second bendable strip to form a connection, with the first bendable strip abutting the second bendable strip outside the connection.

2. The system of claim 1 which further comprises;

a first plastic cap with male threads for threading into the female threads of the first bendable strip;

a second plastic cap with female threads for threading over the male threads of the second bendable strip.

3. The system of claim 1 which further comprises:

a female to male adapter having a first end with male threads and a second open end with female threads, the first end of the adapter being threaded into the female threads of the first bendable strip, and the male threads of the second bendable strip being threaded into the second open end of the adapter, thereby completing a circle.

4. The system of claim 1 which further comprises:

an elongate third bendable strip having a longitudinal axis, and further having a length of plastic-coated wire disposed along the longitudinal axis, the wire having a ferrule with male threads on one end and a ferrule with female threads on a second end;

wherein the male threads of the second bendable strip are threaded into the female threads of the third bendable strip to form a connection, with the second bendable strip abutting the third bendable strip outside the connection.

5. The system of claim 1 wherein the first bendable strip and the second bendable strip are made from foam rubber and the wire is made from a material selected from the group consisting of steel and aluminum.

6. The system of claim 1 wherein the connection of the first bendable strip and the second bendable strip results in a continuous bendable strip having a constant diameter.

7. The system of claim 1 wherein the first bendable strip is between 24 and 36 inches long, and the second bendable strip is between 24 and 36 inches long.

\* \* \* \* \*